June 8, 1954   G. N. O. HEETER   2,680,523
TRAY ATTACHMENT FOR VEHICLE SEATS
Filed Oct. 30, 1952
2 Sheets-Sheet 1
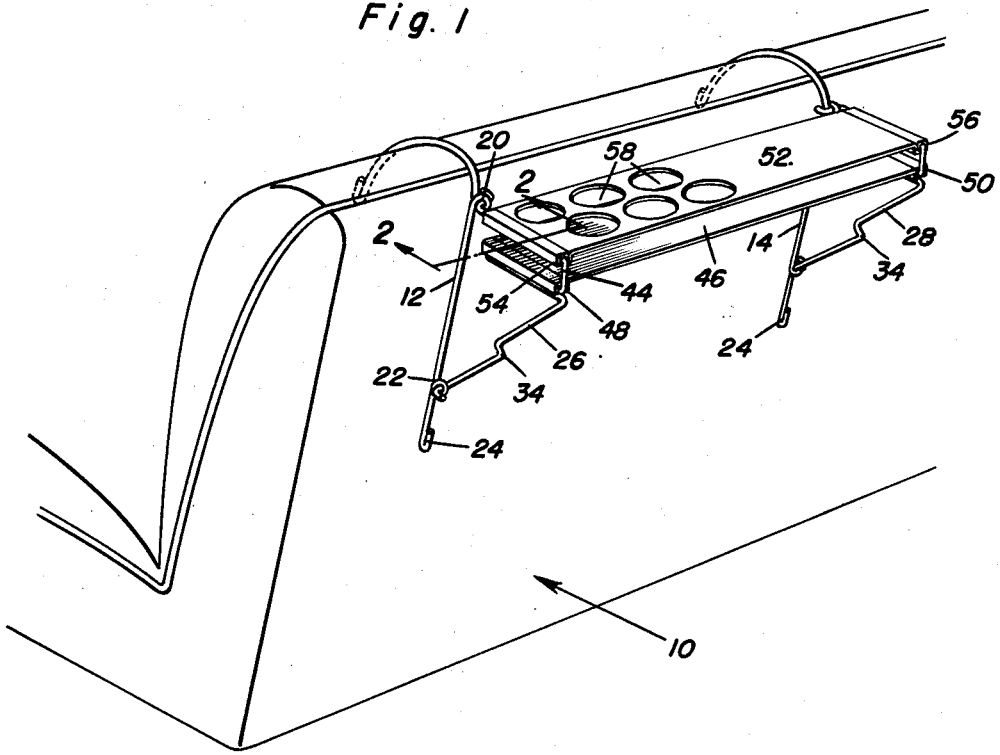
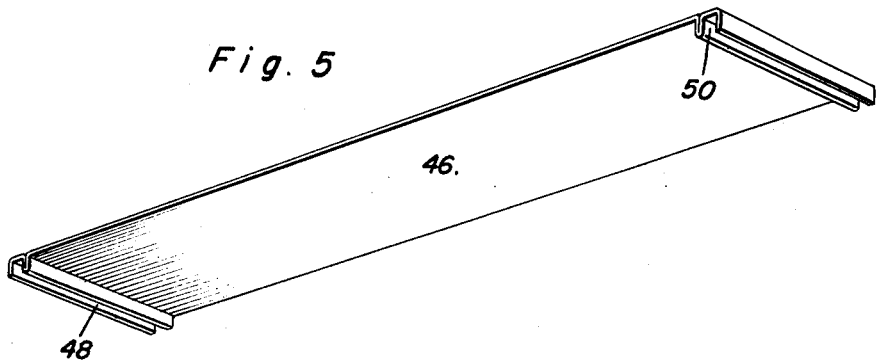
Gale N. O. Heeter
INVENTOR.

June 8, 1954
G. N. O. HEETER
2,680,523
TRAY ATTACHMENT FOR VEHICLE SEATS
Filed Oct. 30, 1952
2 Sheets-Sheet 2
Fig. 2
Fig. 3
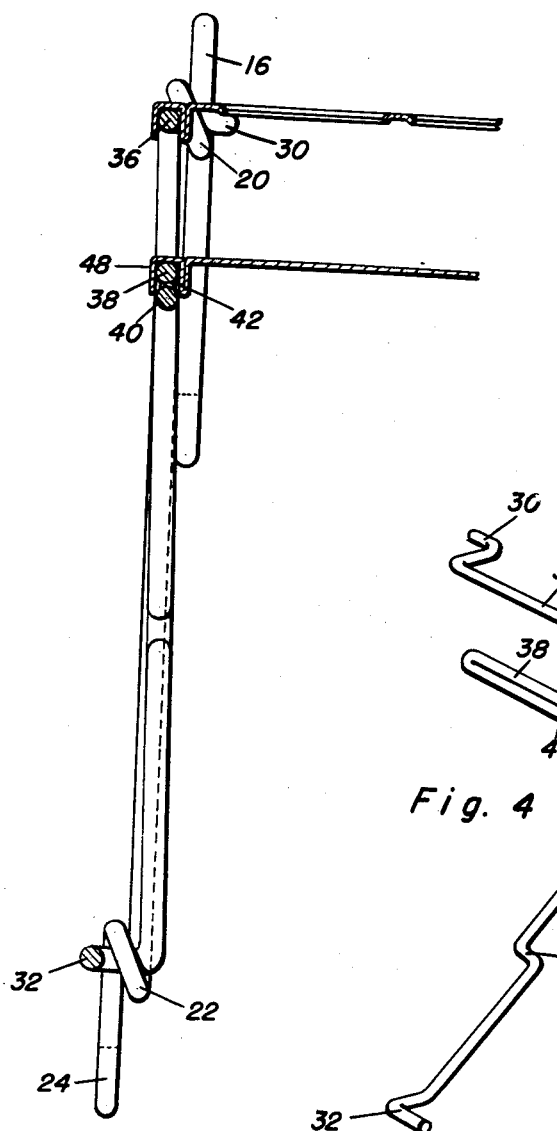
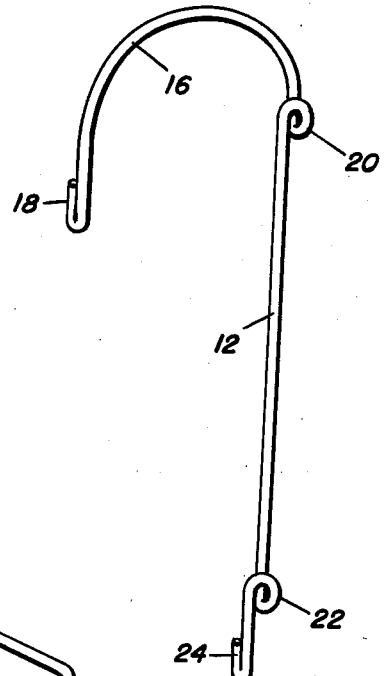
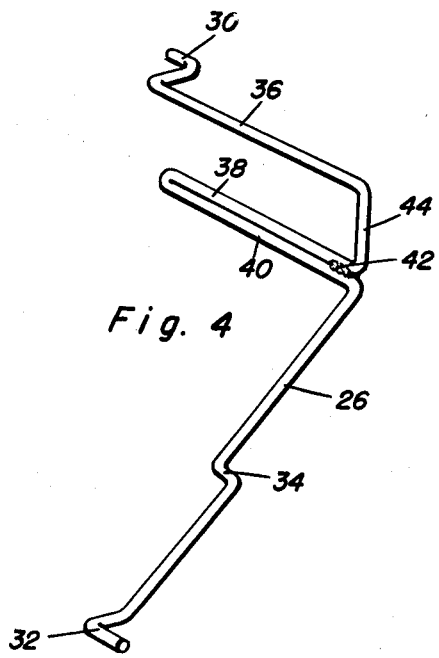
Fig. 4
Gale N. O. Heeter
INVENTOR.
BY *Clarence A. O'Brien*
and *Harvey B. Jacobson*
Attorneys Patented June 8, 1954

2,680,523

UNITED STATES PATENT OFFICE 2,680,523

TRAY ATTACHMENT FOR VEHICLE SEATS

Gale N. O. Heeter, Newport, Ohio

Application October 30, 1952, Serial No. 317,746

2 Claims. (Cl. 211—86)

This invention relates to an automotive vehicle accessory and more particularly to a readily useable tray attachment for a vehicle seat which is especially adapted for use in the tonneau of automobiles.

A particular object of the invention is to provide a readily collapsible tray attachment which is adapted to be supported by the back portion of the front seat of an automotive vehicle and which includes means for supporting a pair of trays in spaced relationship in a secure manner.

This tray attachment may be used for a variety of purposes, such as a play table for children, a drive-in tray capable of supporting tumblers of beverages, as a table for eating while driving, and as a container for sandwiches and beverages.

The invention includes three pairs of principal members, that is seat engaging members, tray supporting members, and a pair of trays. The particular features of the present invention reside in the manner in which the members are assembled so as to lockingly engage each other to hold the various elements in a secure manner.

Still further objects of the invention reside in the provision of a tray attachment for a vehicle seat that is strong, durable, highly efficient in operation, very pleasing in appearance, capable of being rapidly assembled and disassembled, and relatively small and compact when disassembled, and which is comparatively inexpensive to manufacture.

These, together with the various and ancillary objects of the invention which will become apparent as the following description proceeds, are obtained by this tray attachment, a preferred embodiment of which has been illustrated in the accompanying drawings, by way of example only, wherein:

Figure 1 is a perspective view showing the invention in operative placement on the front seat of an automobile;

Figure 2 is a vertical sectional view as taken along the plane of line 2—2 in Figure 1;

Figure 3 is a side elevational view of one of the seat engaging members;

Figure 4 is a perspective view of one of the tray supporting members which are used in holding a pair of trays in spaced relationship; and, Figure 5 is a perspective view looking from the underside so as to show the construction of the channel elements used in holding the trays on the tray supporting members.

With continuing reference to the accompanying drawings wherein like reference numerals designate similar parts throughout the various views, reference numeral 10 generally designates the front seat of an automotive vehicle to which the present invention is adapted to be attached. For securing this invention to the front seat there are provided a pair of spaced substantially parallel seat engaging members 12 and 14. As can be readily seen in Figure 3, each of the seat engaging members are formed with an upper portion 16 which is bent to conform with the cross sectional shape of the front seat of the particular automobile. These members 16 resiliently engage the upper portion of the automobile seat. The end of the upper portion 16 is crimped as at 18 to prevent any deleterious effect on the automobile upholstery. Each of the members 12 and 14 may be made from suitable lengths of tubing or wire and are wrought so as to form loops 20 and 22 in the main body of the member. The other free end of the seat engaging members is crimped as at 24 to prevent damage to the upholstery.

There are provided two spaced tray supporting members 26 and 28, the structure of which can be thus seen in Figure 4. The tray supporting members 26 and 28 are each formed with substantially L-shaped detents 30 and 32 for engagement within loops 20 and 22 of the seat engaging members. One of the more interesting features of the invention resides in the portion 34 which connects the offset portions of the main body of the tray supporting. This portion 34 is adapted to be bent at such angle so as to insure that the trays of the invention are always horizontal.

The tray supporting members 26 and 28 are suitably provided with inwardly extending upper support arms 36. These support arms are formed by inwardly extending sections 38 and 40 which are hung together and which may be welded as at 42 to form a lower supporting element. A central connecting portion 44 connects the upper arm 36 with the lower element 38.

Supported on the lower supporting arms and extending therebetween is a lower tray which is best shown in Figure 5. The tray is generally designated by reference numeral 46 and is substantially rectangular in shape and is formed at its outer ends by being bent to form channels 48 and 50 which are adapted to receive the lower arms therein. An upper tray 52 is provided which has at its outer ends channels 54 and 56 similar to channels to 48 and 50. The channels 54 and 56 are adapted to receive the upper arms 36. Suitable apertures 58 are provided in the upper tray 52 for reception of tumblers holding suitable beverages.

It can be readily understood, each of the parts of this device may be readily separated from the other parts so as to insure that the attachment may be stored in the smallest possible compass. Further, when placed on the front seat as is shown in Figure 1, sandwiches and other foodstuffs may be readily positioned between the trays and tumblers positioned within the apertures 58 so as to be supported by the lower tray 46.

Since from the foregoing, the construction and advantages of this tray attachment for automotive vehicles are readily apparent, further description is believed to be unnecessary.

However, since numerous modifications will readily occur to those skilled in the art, after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A tray attachment for a vehicle seat comprising a pair of horizontally spaced seat engaging members, spaced pairs of loops in each of said seat engaging members, a pair of spaced tray supporting members, detents at the ends of said tray supporting members, said detents being engaged in said loops, said tray supporting members each including a pair of vertically spaced parallel arms, and spaced parallel trays secured on said arms, channel members on the ends of said trays, said arms being received in said channel members, said tray supporting members each having a connecting member joining said arms, one of said trays abutting said connecting member to limit the movement thereof.

2. A tray attachment for a vehicle seat comprising a pair of horizontally spaced seat engaging members, a pair of spaced tray supporting members carried by said seat engaging members, said tray supporting members each including a pair of spaced arms, and spaced trays secured on said arms, channel members on the ends of said trays, said arms being received in said channel members, said tray supporting members each having a connecting member joining said arms, one of said trays abutting said connecting member to limit the movement thereof.

References Cited in the file of this patent

UNITED STATES PATENTS

| Number | Name | Date |
|---|---|---|
| 530,349 | Payne | Dec. 4, 1894 |
| 568,199 | Keeler | Sept. 22, 1896 |
| 1,383,324 | Martell | July 5, 1921 |
| 1,752,985 | Huffman | Apr. 1, 1930 |
| 1,903,262 | Goings | Mar. 28, 1933 |
| 1,926,481 | Fox | Sept. 12, 1933 |
| 2,289,945 | Wadsack | July 14, 1942 |
| 2,474,943 | Hedger | July 5, 1949 |

FOREIGN PATENTS

| Number | Country | Date |
|---|---|---|
| 195,717 | Great Britain | Apr. 3, 1923 |